US011774020B2

United States Patent
Alves Pinto Mosqueira Gomes et al.

(10) Patent No.: US 11,774,020 B2
(45) Date of Patent: Oct. 3, 2023

(54) FLEXIBLE PIPE FOR TRANSPORTING A FLUID IN A SUBMARINE ENVIRONMENT AND ASSOCIATED INSPECTION METHOD

(71) Applicant: TECHNIP N-POWER, Courbevoie (FR)

(72) Inventors: Cristiano Alves Pinto Mosqueira Gomes, Rio de Janeiro (BR); Jean Paul Ferraz, Rio de Janeiro (BR); Fernando Leitao Goncalves Toste, Rio de Janeiro (BR); Carlos Ronaldo Andrade Dos Reis, Rio de Janeiro (BR); Thiago Pontual, Rio de Janeiro (BR); Fabio Rogerio Arruda, Rio de Janeiro (BR); Fred Laaf, Rio de Janeiro (BR); Tiago Vinicius Gama Gomes, Rio de Janeiro (BR)

(73) Assignee: TECHNIP N-POWER

( * ) Notice: Subject to any disclaimer, the term of this patent is extended or adjusted under 35 U.S.C. 154(b) by 108 days.

(21) Appl. No.: 17/620,151

(22) PCT Filed: Jun. 22, 2020

(86) PCT No.: PCT/HR2020/051083
§ 371 (c)(1),
(2) Date: Dec. 17, 2021

(87) PCT Pub. No.: WO2020/254775
PCT Pub. Date: Dec. 24, 2020

(65) Prior Publication Data
US 2022/0364662 A1 Nov. 17, 2022

(30) Foreign Application Priority Data

Jun. 20, 2019 (FR) ...................................... 1906629

(51) Int. Cl.
*F16L 11/20* (2006.01)
*F16L 33/01* (2006.01)
*F16L 11/08* (2006.01)

(52) U.S. Cl.
CPC ............. *F16L 33/01* (2013.01); *F16L 11/083* (2013.01); *F16L 11/20* (2013.01); *F16L 2201/30* (2013.01)

(58) Field of Classification Search
CPC .......... F16L 33/01; F16L 11/083; F16L 11/20; F16L 2201/30
(Continued)

(56) References Cited

U.S. PATENT DOCUMENTS 8,891,070 B2 * 11/2014 Weppenaar ............. F16L 55/00
356/34
2011/0026031 A1 * 2/2011 Kristiansen ........ G01N 29/2425
356/440

(Continued)

FOREIGN PATENT DOCUMENTS

EP 0 535 997 A1 4/1993
FR 3 016 422 A1 7/2015
(Continued)

OTHER PUBLICATIONS

International Search Report dated Oct. 16, 2020 in corresponding PCT International Application No. PCT/FR2020/051083.
(Continued)

*Primary Examiner* — Craig M Schneider
*Assistant Examiner* — David R Deal
(74) *Attorney, Agent, or Firm* — OSTROLENK FABER LLP

(57) ABSTRACT

A flexible conduit for transporting a fluid in a submarine environment, suitable for being inspected by an ultrasonic
(Continued)

control method for detecting the presence of water in the annular space.

13 Claims, 3 Drawing Sheets

(58) Field of Classification Search
USPC .......................................................... 138/103
See application file for complete search history.

(56) References Cited

U.S. PATENT DOCUMENTS

| 2012/0222770 A1* | 9/2012 | Kristiansen | G01K 11/3206 |
| | | | 138/137 |
| 2016/0097471 A1* | 4/2016 | Moller Andersen | F16L 11/08 |
| | | | 138/103 |
| 2017/0299369 A1* | 10/2017 | McNab | E21B 17/017 |

FOREIGN PATENT DOCUMENTS

| WO | WO 2009/007670 A1 | 1/2009 |
| WO | WO 2012/110637 A1 | 8/2012 |

OTHER PUBLICATIONS

Written Opinion dated Oct. 16, 2020 in corresponding PCT International Application No. PCT/FR2020/051083.

\* cited by examiner

FLEXIBLE PIPE FOR TRANSPORTING A FLUID IN A SUBMARINE ENVIRONMENT AND ASSOCIATED INSPECTION METHOD

CROSS-REFERENCE TO RELATED APPLICATIONS

The present application is a 35 U.S.C. §§ 371 national phase conversion of PCT/FR2020/051083, filed Jun. 22, 2020, which claims priority to French Patent Application No. 1906629, filed Jun. 20, 2019, the contents of which are incorporated herein by reference. The PCT International Application was published in the French language.

TECHNICAL FIELD OF THE INVENTION

The invention relates to the technical field of flexible pipes for transporting a fluid in an underwater environment.

More particularly, the invention relates to unbonded flexible pipes used for transporting hydrocarbons in an underwater environment.

PRIOR ART

Flexible pipes for transporting a fluid in an underwater environment are submerged in a body of water at depths that can exceed 3000 m. They are particularly beneficial for conveying water and/or hydrocarbons between a bottom installation and a surface installation. They can also be used to connect two bottom installations. Specific flexible pipes can moreover be used to connect two surface installations.

The structure of a flexible pipe is described for example in the normative documents API RP 17B, 5th edition, published in May 2014, and API 17J, 4th edition, published in May 2014 by the American Petroleum Institute.

Typically, a flexible pipe comprises an internal sealing sheath, which is referred to in the technical field of the invention as "pressure sheath". The internal sealing sheath forms an internal passage for circulation of the fluid and thus transports it in a sealed manner.

Significant tensile forces can act on the flexible pipe, in particular when it extends through deep bodies of water. A pair of tensile armor plies is arranged around the internal sheath in order to take up these tensile forces. The pair of tensile armor plies is typically composed of metal wires wound in a long-pitch helix, that is to say that the absolute value of the helix angle is between 20° and 55°.

In order to prevent water of the body of water from entering the flexible pipe, the latter generally comprises a protective polymeric external sheath arranged around the pair of tensile armor plies. The external sheath generally has a thickness of 10 mm.

The internal sheath and the external sheath delimit a space referred to as annular space. The pair of tensile armor plies is arranged within the annular space.

The transported fluid is generally composed of crude hydrocarbons. These hydrocarbons generally comprise a mixture of gases such as carbon dioxide, methane, or hydrogen sulfide. The transported fluid also comprises water and possibly sand particles.

The gases contained in the transported fluid diffuse through the internal sheath and accumulate within the annular space. The annular space also comprises water which results from an accidental loss of sealing of the external sheath and/or from the diffusion and condensation of water contained in the fluid transported through the internal sheath. The presence of water and of these gases within the annular space gives rise to various phenomena of corrosion of the metallic armor wires within the annular space. The armor wires can then undergo stress corrosion cracking (SCC), for example.

It is therefore necessary to be able to inspect the flexible pipe when it is submerged and in use in order to detect the possible presence of water within the annular space, in order to prevent a possible problem of corrosion of the steel armor wires.

WO2009/007670 describes an inspection method aimed at detecting the presence of water in the annular space of a flexible pipe. This method is based on an ultrasonic echography technique. An ultrasonic wave is sent into the annular space of the flexible pipe through the external sheath by using an ultrasonic transducer disposed outside the flexible pipe and in the vicinity of the polymeric external sheath of the flexible pipe. This wave is partially reflected in the annular space, in particular by the metallic armor layers, the intensity of the reflected wave depending on the possible presence of water in the annular space. The ultrasonic transducer measures the reflected wave and the analysis of the echogram makes it possible to detect the possible presence of water in the annulus. This inspection method is not reliable enough, in particular when the external sheath of the flexible pipe is thick and is composed of a polymeric material which strongly absorbs ultrasound.

Consequently, there is a need to provide a flexible pipe in which the annular space can be inspected when the pipe is submerged and in use, so as to be able to reliably detect the possible presence of water in the annular space.

SUMMARY OF THE INVENTION

To that end, the invention relates to a flexible pipe for transporting a petroleum fluid in an underwater environment, comprising a flexible tubular section and two end fittings, each of the two ends of said flexible tubular section being connected to one of said two end fittings. Said flexible tubular section comprises, from the inside to the outside, a polymeric internal sheath for forming a passage for circulation of the fluid, at least one armor layer, and a polymeric external sheath. Said internal sheath and external sheath delimit an annular space in which said at least one armor layer is arranged. Each of said two end fittings comprises, from the inside to the outside, an end vault connected in a sealed manner to said internal sheath so as to form a passage for circulation of the petroleum fluid, means for anchoring said at least one armor layer, and a metal cap. Said cap is attached to said end vault and is connected in a sealed manner to said external sheath. In addition, according to the invention, at least one of said two end fittings has a cavity connected to said annular space by communication means, said communication means being able to circulate water from said annular space toward said cavity, said cap forming the outer wall of said cavity, in such a way that it is possible to detect the presence of water in said annular space by inspecting said cavity with an ultrasonic transducer disposed outside said cap in line with said cavity.

Thus, the invention is characterized for the one part by the addition, in at least one of the two end fittings, of a cavity communicating with the annular space of the flexible pipe, and for the other part by the fact that this cavity is disposed just below the metal cap of the end fitting. This cavity is initially filled with air when the annular space is dry. If the annular space is flooded when the pipe is in use, then the cavity fills with water and it is therefore possible to indirectly detect the presence of water in the annular space by detecting the presence of water in the cavity. Moreover, since the cap of the fitting is metallic, an ultrasonic wave can easily pass through it, with a very low level of attenuation, and it is therefore possible to reliably detect the presence of water in the cavity by using an ultrasonic echography method operated from the external face of the cap in line with the cavity. In addition, the fact that the outer wall of the cavity is the cap of the fitting simplifies the structure of the fitting and therefore reduces its cost, by avoiding the addition of supplemental parts, in particular by avoiding the addition of a sealed cover separate from the cap with the aim of isolating the cavity of the fitting from the exterior space. According to the present invention, it is the metal cap of the fitting which has the function of isolating the cavity from the exterior space in a sealed manner, thereby making it possible not only to simplify the structure of the fitting, but also to obtain a very strong and perfectly sealed cavity outer wall. It is essential that the outer wall of the cavity is perfectly sealed, because a loss of sealing of the outer wall of the cavity would cause the cavity to be flooded with sea water, and this sea water would then flood the annular space of the flexible tubular section by flowing along the communication means. The use of the cap of the fitting as outer wall of the cavity affords a simple, robust and reliable solution.

Preferably, said cavity is located at the front of said anchoring means. "Front side" is understood to mean the side furthest away from the flexible tubular section to which the end fitting in question is connected. In this way, the cavity may be integrated into the fitting without necessitating an increase in the external diameter of the fitting.

It would also be possible to dispose the cavity between the anchoring means and the cap or else on the back side of the anchoring means. "Back side" is understood to mean the side closest to the flexible tubular section to which the end fitting in question is connected.

In addition, advantageously, said cap has a constant thickness in line with said cavity. In this case, preferably, the thickness of said cap in line with said cavity is between 10 mm and 60 mm. The cover thus simultaneously has high mechanical strength, is perfectly sealed, and can be passed through easily by the ultrasonic wave during the inspection of the flexible pipe.

Moreover, advantageously, said cavity has a volume of between 0.1 and 10 liters, preferably between 1 and 10 liters. This improves the reliability of the inspection because the risk of confusing flooding with traces of moisture is eliminated by virtue of the large volume of the cavity and the possibility of limiting the alarms to solely cases in which the cavity is completely filled with water.

Moreover, advantageously, said end vault forms the inner wall of said cavity. This simplifies the design of the fitting, makes it easier to assemble and reduces its cost.

In addition, advantageously, said cavity is axisymmetric and coaxial with respect to the central longitudinal axis of said at least one end fitting. Moreover, advantageously, the internal and external faces of said cavity are cylindrical and coaxial. This makes it possible in particular to obtain a cavity of annular geometry passing all the way around the fitting. This feature facilitates the ultrasonic inspection of the fitting when it is placed on the seabed and in some instances partially buried. Therefore, whichever part of the fitting protrudes from the seabed and is accessible for the application of an ultrasonic transducer, this part necessarily has a part of the cap located in line with the cavity, this making it possible to carry out the ultrasonic inspection in order to detect the presence of water in the annular space.

Another advantage of this geometric feature is that it facilitates the use of ultrasonic echography monitoring methods in which the incident ultrasonic wave emitted by the transducer propagates in a radial direction with respect to the longitudinal axis of the fitting. Therefore, the various interfaces through which the incident ultrasonic wave passes are cylindrical surfaces, in particular the external and internal faces of the cap forming the outer wall of the cavity, and also the external face of the inner wall of the cavity. Consequently, the incident ultrasonic wave propagates radially from the outside to the inside of the fitting, and the ultrasonic waves reflected by the various interfaces propagate radially toward the outside of the fitting and follow the same radius as that followed by the incident wave. In this way, the reflected waves are sent back toward the ultrasonic transducer, which can therefore easily detect and measure the associated echoes. Consequently, it is possible to obtain good-quality signals, thereby improving the reliability of the detection of the presence of water in the cavity.

According to another variant, the internal and external faces of said cavity are flat and parallel. This variant makes it possible to use an ultrasonic monitoring method in which the incident wave emitted by the ultrasonic transducer propagates in a direction perpendicular to the flat faces, in such a way that the waves reflected by these faces are sent back in the same direction toward the ultrasonic transducer. The waves reflected by the cavity can thus be easily detected and precisely measured by the transducer, thereby improving the reliability of the detection of the presence of water in the cavity.

The invention also relates to a method for inspecting during use a flexible pipe for transporting a fluid in an underwater environment, said method comprising the following steps:

(a) supplying and installing, in an underwater environment, a flexible pipe according to the invention, (b) applying an ultrasonic transducer against or in the vicinity of the external face of the cap of said at least one end fitting having a cavity, said ultrasonic transducer being placed so as to be able to send an ultrasonic wave toward said cavity, (c) generating an incident ultrasonic wave with said ultrasonic transducer, said wave propagating through said cap to said cavity, (d) receiving with said ultrasonic transducer the ultrasonic wave sent back by said cavity and recording the corresponding ultrasonic signal, (e) analyzing said ultrasonic signal to determine whether said cavity is filled with air or water, so as to determine the absence or the presence of water in the annular space of said flexible pipe.

Advantageously and according to a first variant, during step (b) said transducer is in direct contact with the external face of said cap in line with said cavity.

Advantageously and according to another variant, during step (b) said transducer is not in direct contact with the external face of said cap, the ultrasonic coupling between said transducer and said cap being produced by the sea water.

Advantageously, during step (c) the incident ultrasonic wave is a compression wave which propagates in a radial direction with respect to said at least one end fitting.

DESCRIPTION OF THE FIGURES

Other particular features and advantages of the invention will emerge on reading the following description of particular embodiments of the invention, given by way of non-limiting indication, with reference to the appended drawings in which.

DETAILED DESCRIPTION OF EMBODIMENTS OF THE INVENTION

Figure 1:
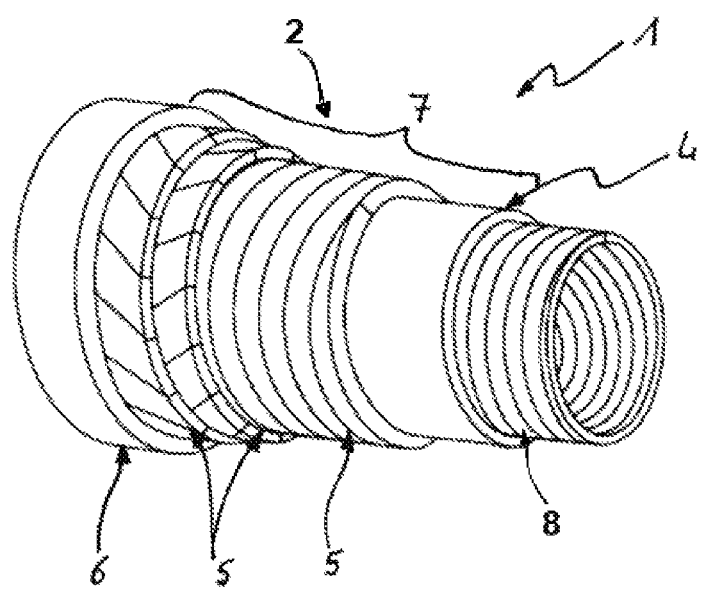
FIG. 1 schematically shows a perspective view of an example of a flexible tubular section of a flexible pipe according to the invention, FIG. 2 schematically shows a partial cross-sectional view of an end fitting of a flexible pipe according to the invention, and FIG. 3 schematically shows a partial cross-sectional view of a step of the inspection method according to the invention.

FIG. 1 shows an example of a flexible tubular section (2) of a flexible pipe (1) according to the invention.

The flexible pipe (1) is intended to be submerged in a body of water. The body of water may be a lake, a sea or an ocean. In general, the depth of the body of water is at least 100 m, and more particularly is between 500 m and 3000 m.

The flexible pipe (1) conveys a fluid through the body of water between a first installation and a second installation. The first installation is for example an underwater installation such as a wellhead or a manifold. The second installation is for example a surface installation such as a floating production, storage and offloading unit (FPSO) or a tension leg platform (TLP). The flexible pipe (1) transports the fluid between two surface installations or between an underwater installation and a surface installation or else between two underwater installations.

The fluid transported by the flexible pipe (1) is for example water and/or a petroleum fluid and/or gas fluid. The petroleum fluid and/or gas fluid is formed by a multiphase mixture comprising a liquid part formed mainly by linear and/or cyclic, saturated and/or unsaturated carbon-containing compounds of variable density and water, a gaseous part composed for example of methane (CH4), carbon dioxide (CO2), hydrogen sulfide (H2S) and other gases, and lastly a solid part generally composed of sand particles. The temperature of the fluid within the flexible pipe (1) is between 50° C. and 200° C., more particularly between 50° C. and 130° C. The temperature of the fluid varies during the transport between the first installation and the second installation.

The fluid has for example a carbon dioxide partial pressure of between 1 bar and 300 bar and a hydrogen sulfide partial pressure of less than 1 bar. The partial pressure of each of the gases within the fluid depends in particular on the nature of the oilfield and/or gas field exploited.

As is shown by way of example in FIG. 1, the flexible tubular section (2) of the flexible pipe (1) comprises a plurality of concentric layers arranged about a longitudinal axis. According to the invention, the flexible tubular section (2) of the flexible pipe (1) comprises a polymeric internal sheath (4), at least one armor layer (5) and a polymeric external sheath (6).

The flexible pipe (1) is preferably an unbonded flexible pipe. Within the meaning of the present invention, "unbonded" is understood to mean a flexible pipe (1) in which the armor layer is free to move in relation to the internal sheath (4) in the event of bending of the flexible pipe (1). It is preferably the case that all of the layers of the flexible pipe (1) are free to move in relation to one another. This makes the flexible pipe (1) more flexible than a pipe in which the layers are bonded to one another.

It is preferably the case that the flexible tubular section (2) of the flexible pipe (1) also comprises an internal carcass (8) arranged inside the internal sheath (4). The function of the internal carcass (8) is to take up the radial crushing forces, in particular those linked to the hydrostatic pressure. The internal carcass (8) is generally formed from an S-shaped, profiled metal strip wound in turns that are interlocked with one another.

A flexible pipe (1) comprising an internal carcass (8) is referred to as a rough-bore pipe. A flexible pipe (1) which does not have an internal carcass (8) and in which the innermost layer is the internal sheath (4) is referred to as a smooth-bore pipe. The present invention is applicable without distinction to smooth-bore and rough-bore flexible pipes.

The internal sheath (4) is arranged around the internal carcass (8) when the latter is present. The internal sheath (4) forms a passage for circulation of the fluid. It transports the fluid through the body of water in a sealed manner. The internal sheath (4) is polymeric, that is to say that more than 50% of the material forming the internal sheath (4) is a polymer. The polymer is for example a polyolefin, such as a polypropylene, a polyethylene or a polyamide, or else a fluoropolymer, such as a polyvinylidene fluoride (PVDF). The polymeric material is chosen depending on the nature and the temperature of the fluid transported. The thickness of the internal sheath (4) is for example between 4 mm and 15 mm. The internal sheath (4) is produced by extrusion, for example around the internal carcass.

The at least one armor layer (5) is intended to strengthen the flexible pipe (1) against tensile and pressure forces.

The flexible tubular section (2) of the flexible pipe (1) advantageously has a crossed pair of tensile armor plies wound with a long pitch. "Long pitch" is understood to mean a helix angle with an absolute value of between 20° and 55°. The cross section of the tensile armor wires is rectangular or circular, for example. The tensile armor wires are advantageously metallic. The metallic material is a carbon steel, for example.

The polymeric external sheath (6) is arranged around the pair of the at least one armor layer (5). The external sheath (6) is impermeable to liquids and forms a protective barrier against water from the body of water entering the interior of the flexible tubular section (2) of the flexible pipe (1).

The external sheath (6) and the internal sheath (4) delimit between them an annular space (7). According to the example shown in FIG. 1, the annular space comprises a pressure vault and a pair of tensile armor plies (5).

The pressure vault of the flexible tubular section (2) of the flexible pipe (1) is an optional armor layer wound with a short pitch around the internal sheath (4). The function of the pressure vault is to increase the resistance to pressure of the flexible pipe (1). It is advantageously composed of metal wires in a Z, T, K, U or X shape, the turns of which are interlocked with one another. "Short pitch" is understood to mean a helix angle with an absolute value of between 60° and 90°.

Figure 2:
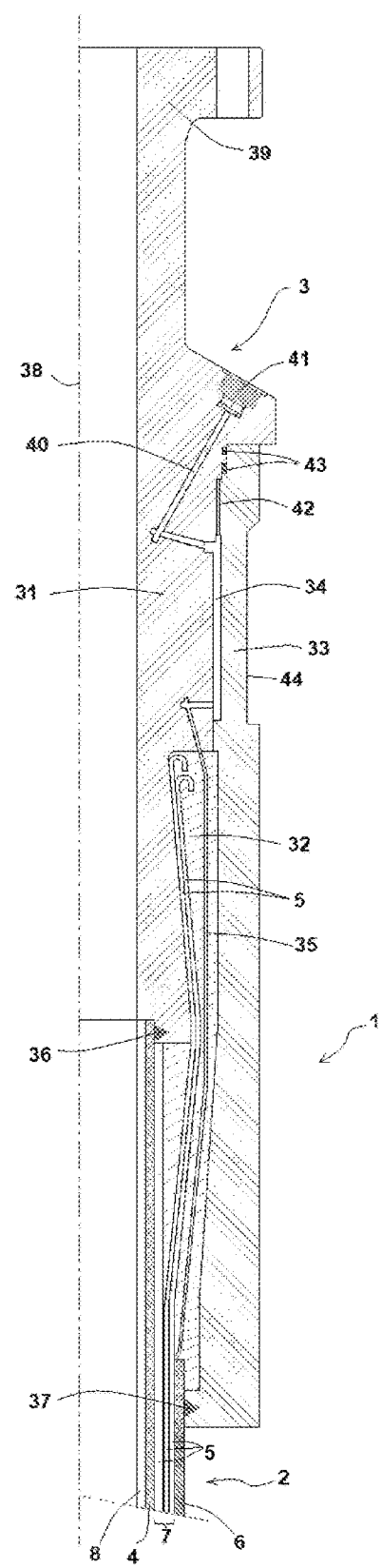

As is shown in FIG. 2, the end fitting (3) of the flexible pipe (1) comprises, from the inside to the outside, an end vault (31) and a cap (33) attached to the end vault (31). The armor layer(s) (5) of the pipe is/are anchored to the fitting by anchoring means (32) which are generally composed of a resin-filled chamber inside which the ends of the armor wires are fixed, in particular when the armor wires are the tensile armor wires wound with a long pitch.

The end vault (31) of the end fitting (3) is an advantageously metallic, substantially tubular part, inside which the petroleum fluid circulates. It is connected in a sealed manner to the polymeric internal sheath (4) of the flexible tubular section (2) using the internal sealed-connection means (36), in such a way that the petroleum fluid can flow from the inside of the end vault (31) toward the inside of the flexible tubular section (2) while remaining confined inside the flexible pipe (1). The internal sealed-connection means (36) advantageously have means for crimping the internal sheath (4).

The cap (33) of the end fitting (3) is an advantageously metallic, substantially tubular part connected in a sealed manner to the external sheath (6) of the flexible tubular section (2) by means of external sealed-connection means (37). The external sealed-connection means (37) advantageously have means for crimping the external sheath (6).

The front end of the end fitting (3) advantageously has a flange (39) for connecting the flexible pipe (1) to an item of external equipment.

The end vault (31) and the cap (33) advantageously have the same longitudinal axis (38) and are substantially axisymmetric with respect to the longitudinal axis (38). The end of the cap (33) which is furthest away from the flexible tubular section (2), also referred to as front end of the cap, is attached to the end vault (31) by attachment means advantageously having a thread (42), the cap (33) being screwed on the end vault. Other attachment means may be used to attach the cap (33) to the end vault (31), for example screws. O-rings (43) are disposed between the cap (33) and the end vault (31) to seal the attachment between the cap (33) and the end vault (31) and in particular to prevent sea water from being able to enter the interior of the end fitting (3) at this attachment.

The end of the tensile armor plies (5) of the flexible tubular section (2) continues under the cap (33) in the rear part of the end fitting (3), and finishes between the end vault (31) and the cap (33). The rear part of the end fitting (3) is that located on the side of the flexible tubular section (2) to which the end fitting (3) is connected. The end fitting (3) has means (32) for anchoring the armor plies (5), which means advantageously consist in a fixation of the end of each armor wire, which end was previously deformed into the shape of a hook, using a thermosetting epoxy resin which has been poured into the rear part of the wall of the end fitting (3).

The end fitting (3) has a cavity (34) located under the cap (33) on the front side of the end fitting (3). The cap (33) constitutes the external wall of the cavity (34). The end vault (31) constitutes the internal wall of the cavity (34). In addition, advantageously, the cavity (34) is axisymmetric and coaxial with respect to the central longitudinal axis (38) of the end fitting (3). The end fitting (3) comprises communication means (35) which are able to circulate water from the annular space (7) toward the cavity (34) and which are advantageously composed of at least one tube connecting the annular space (7) to the cavity (34).

During the manufacture and installation at sea of the flexible pipe (1), the cavity (34) is filled with gas, advantageously with dry air having a pressure substantially equal to atmospheric pressure. When the flexible pipe (1) is installed in an underwater environment, in the event of accidental flooding of the annular space (7) of the flexible tubular section (2), for example due to a tear in the polymeric external sheath (6), the cavity (34) fills with sea water via the circulation means (35). In order to make it easier for water to fill the cavity (34), the end fitting (3) advantageously has air discharging means (40) which are in the form of a chamber (40) connected to the cavity (34) on the opposite side from the communication means (35). Thus, when water from the annular space (7) circulates toward the cavity (34) along the communication means (35), the air which was initially present in the cavity (34) can easily leave the cavity (34) by escaping toward the discharge means (40), and so the cavity (34) can completely fill with water without air remaining trapped inside, this then facilitating the detection of water using an ultrasonic transducer. The discharge means 40 may be connected to the outside of the pipe, for example via a non-return valve. They may also be completely isolated from the outside, for example via a sealing stopper (41), but in this case it is necessary that the volume of the chamber (40) is sufficient to accommodate the air from the cavity (40).

Figure 3:
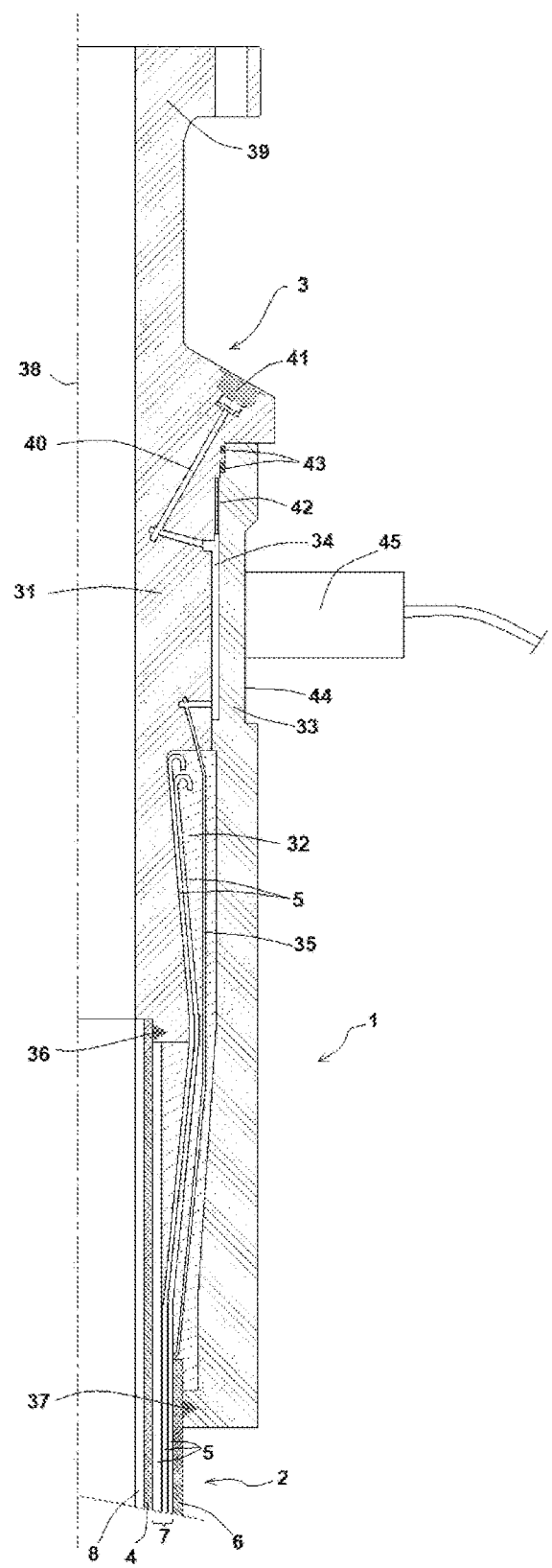

As shown in FIG. 3, the method for inspecting the flexible pipe (1) during use has a step of applying an ultrasonic transducer (45) in the vicinity of the external face of the cap (33) of the end fitting (3), facing the cavity (34). In order to precisely identify the location where the transducer (45) has to be applied, the end fitting advantageously has an external groove (44) located facing the cavity (34).

The transducer is operated by a diver or by a remote-controlled underwater robot of the ROV type.

The ultrasonic monitoring method is advantageously an echography monitoring method. The frequency of the ultrasonic transducer is advantageously between 1 MHz and 15 MHz, preferably between 5 MHz and 10 MHz. The transducer advantageously generates an incident compression wave (longitudinal wave), which propagates radially toward the inside of the end fitting (3), and measures the wave sent back by the cavity (34) when it returns. This wave that is sent back is comprised of multiple waves reflected by each of the interfaces through which the incident wave passes, and in particular for the one part the wave reflected by the interface between the internal face of the cap (33) and the cavity (34), and for the other part the wave reflected by the interface between the cavity (34) and the external face of the end vault (31). The first of these two reflected waves is recorded by the transducer in the form of an input echo in the cavity, while the second is recorded in the form of an output echo.

When the cavity (34) is filled with air, the incident ultrasonic wave is almost completely reflected at the input interface in the cavity, because ultrasonic waves with a frequency above 1 MHz virtually do not propagate in the air. This generates a very strong input echo and no output echo.

When the cavity (34) is filled with water, the incident ultrasonic wave can easily propagate into the cavity due to the acoustic properties of the water. Consequently, the amplitude of the input echo decreases sharply and a high-amplitude output echo is additionally observed. By measuring the amplitude of the input and output echoes, it is thus possible to reliably detect the presence of water inside the cavity (34), thereby making it possible to deduce the presence of water in the annular space (7) of the flexible tubular section (2).

The invention claimed is:

1. A flexible pipe for transporting a petroleum fluid in an underwater environment, comprising a flexible tubular section and two end fittings, each of the two ends of said flexible tubular section being connected to one of said two end fittings, said flexible tubular section comprising, from the inside to the outside, a polymeric internal sheath for forming a passage for circulation of the fluid, at least one armor layer, and a polymeric external sheath, said internal sheath and external sheath delimiting an annular space in which said at least one armor layer is arranged, each of said two end fittings comprising, from the inside to the outside, an end vault connected in a sealed manner to said internal sheath for forming a passage for circulation of the petroleum fluid, means for anchoring said at least one armor layer, and a metal cap, said cap being attached to said end vault and being connected in a sealed manner to said external sheath, wherein at least one of said two end fittings has a cavity connected to said annular space by communication means, said communication means being able to circulate water from said annular space toward said cavity, said cap forming the outer wall of said cavity, in such a way that it is possible to detect the presence of water in said annular space by inspecting said cavity with an ultrasonic transducer disposed outside said cap in line with said cavity.

2. The flexible pipe as claimed in claim 1, wherein said cavity is located at the front of said anchoring means.

3. The flexible pipe as claimed in claim 2, wherein said end vault forms the internal wall of said cavity.

4. The flexible pipe as claimed in claim 1, wherein said cap has a constant thickness in line with said cavity.

5. The flexible pipe as claimed in claim 4, wherein the thickness of said cap in line with said cavity is between 10 mm and 60 mm.

6. The flexible pipe as claimed in claim 1, wherein said cavity has a volume of between 0.1 and 10 liters.

7. The flexible pipe as claimed in claim 1, wherein said cavity is axisymmetric and coaxial with respect to the central longitudinal axis of said at least one end fitting.

8. The flexible pipe as claimed in claim 7, wherein the internal and external faces of said cavity are cylindrical and coaxial.

9. The flexible pipe as claimed in claim 1, wherein the internal and external faces of said cavity are flat and parallel.

10. A method for inspecting during use a flexible pipe for transporting a fluid in an underwater environment, said method comprising the following steps:
  (a) supplying and installing, in an underwater environment, a flexible pipe as claimed in claim 1,
  (b) applying an ultrasonic transducer against or in the vicinity of the external face of the cap of said at least one end fitting having a cavity, said ultrasonic transducer being placed so as to be able to send an ultrasonic wave toward said cavity,
  (c) generating an incident ultrasonic wave with said ultrasonic transducer, said wave propagating through said cap to said cavity,
  (d) receiving with said ultrasonic transducer the ultrasonic wave sent back by said cavity and recording the corresponding ultrasonic signal,
  (e) analyzing said ultrasonic signal to determine whether said cavity is filled with air or water, so as to determine the absence or the presence of water in the annular space of said flexible pipe.

11. The method as claimed in claim 10, wherein during step said transducer is in direct contact with the external face of said cap in line with said cavity.

12. The method as claimed in claim 10, wherein during step said transducer is not in direct contact with the external face of said cap, the ultrasonic coupling between said transducer and said cap being produced by the sea water.

13. The method as claimed in claim 10, wherein during step the incident ultrasonic wave is a compression wave which propagates in a radial direction with respect to said at least one end fitting.

* * * * *